(12) United States Patent
Merz

(10) Patent No.: US 7,109,513 B2
(45) Date of Patent: Sep. 19, 2006

(54) USE OF WICKING MEANS TO MANAGE FLUIDS ON OPTICAL LEVEL SENSING SYSTEMS

(75) Inventor: Eric A. Merz, Palmyra, NY (US)

(73) Assignee: Fuji Xerox Co., Ltd., Tokyo (JP)

( * ) Notice: Subject to any disclaimer, the term of this patent is extended or adjusted under 35 U.S.C. 154(b) by 176 days.

(21) Appl. No.: 10/747,437

(22) Filed: Dec. 30, 2003

(65) Prior Publication Data

US 2005/0139793 A1 Jun. 30, 2005

(51) Int. Cl.
*G01N 15/06* (2006.01)
(52) U.S. Cl. .............................. 250/577; 347/7; 73/293
(58) Field of Classification Search ........ 250/573–577, 250/900–908; 347/7; 73/293, 327
See application file for complete search history.

(56) References Cited

U.S. PATENT DOCUMENTS

| 4,155,013 | A | * | 5/1979 | Spiteri ......................... 250/577 |
| 5,534,708 | A | * | 7/1996 | Ellinger et al. ............. 250/577 |
| 5,616,929 | A | | 4/1997 | Hara .......................... 250/573 |
| 5,997,121 | A | | 12/1999 | Altfather et al. ............... 347/7 |

* cited by examiner

*Primary Examiner*—Thanh X. Luu
(74) *Attorney, Agent, or Firm*—Oliff & Berridge, PLC

(57) ABSTRACT

A fluid reservoir sensing system includes a pair of optical prisms or sensor targets that reflect light when a fluid level is below one of the pair of prisms or sensor targets. The pair of optical prisms or sensor targets includes a low prism or sensor target usable to sense a low liquid level in the fluid reservoir, and a high prism or sensor target usable to sense a high liquid level in the fluid reservoir, and a wicking means to wick fluid away from the high incident and low incident surfaces of the prisms or sensor targets that are above the fluid level. The fluid reservoir sensing system optionally includes an emitter and a photosensor.

19 Claims, 7 Drawing Sheets

USE OF WICKING MEANS TO MANAGE FLUIDS ON OPTICAL LEVEL SENSING SYSTEMS

BACKGROUND OF THE INVENTION

1. Field of Invention

This invention relates to sensing fluid quantity in a refillable fluid container.

2. Description of Related Art

Fluid ejector systems, such as drop-on-demand liquid ink printers, have at least one fluid ejector from which droplets of fluid are ejected towards a receiving sheet. Scanning ink jet printers are equipped with fluid ejection heads containing fluid ink. The ink is applied to a sheet in an arrangement based on print data received from a computer, scanner or similar device. To control the delivery of the fluid to the sheet, fluid ejection heads are moved across the sheet to provide the fluid to the sheet, which is ejected as drops. These drops correspond to a liquid volume designated as pixels. Each pixel is related to a quantity needed to darken or cover a particular unit area.

In order to lower cost and improve performance by limiting inertia, moving-head fluid ejection systems are designed with low weight fluid ejection heads that often use refillable fluid containers. In order to minimize weight, the fluid ejection heads contain a relatively small quantity of fluid. Consequently, the fluid ejection heads (or their fluid reservoirs) must either be replaced or refilled periodically. Replaceable cartridges are commonly used in home-use printers. Some heavier-use printers in industry attach the fluid ejection head via an umbilical tube to a larger tank for continuous refilling. Other heavier-use printers refill the fluid ejection head periodically.

SUMMARY OF THE INVENTION

Replacing cartridges requires frequent interaction by the user, and is considered disadvantageous for fluid ejectors used in volume production or connected by a network to the ejection data source. Umbilical systems can be expensive, requiring pressurization, tubing, tube harness dressing, and can suffer performance degradation from moisture loss, pressure fluctuations due to acceleration or temperature variation, and motion hysteresis from tubing harness drag.

One common fluid ejection system is an inkjet printer. In an ink jet printer, periodic refill systems commonly do not accurately meter the ink that is deposited into the printhead. Consequently, the ink reservoir in a printhead must be significantly underfilled in order to avoid excess ink spilling out of the refilled printhead ink reservoir. Consequently, this under-filling wastes space and reduces the productivity of the printer due to the greater frequency of refill operations.

Similarly, other containers for consumable fluids in various applications of fluid ejection may require sensing fluid level for refill or replacement of the fluid in a fluid reservoir. Such applications include, but are not limited to dispensing medication, pharmaceuticals, photo results and the like onto a receiving medium, injecting reducing agents into engine exhaust to control emissions, draining condensation during refrigeration, etc. Other technologies that use refillable fluid containers include fuel cells, fuel tanks, chemical handling systems and electric batteries. Fluid level sensing in fluid container in these technologies is difficult because electrical fluid sensing may introduce hazards, e.g., spark ignition into the fluid contained in the fluid container, or in which the fluid may deteriorate the electrical sensors, e.g., from corrosion.

One optical level sensing system for a fluid reservoir includes one or more sensor targets, such as optical prisms, to reflect light from an emitter to a photosensor. The sensor system determines whether the fluid level descends below one or both of the sensor targets. The sensor targets may include a low prism or sensor target at a low liquid level in the fluid reservoir, and a high prism or sensor target at a high liquid level in the fluid reservoir. The emitter projects the light ray through at least one of the low prism or sensor target to the low incident surface and the high prism or sensor target to the high incident surface. The photosensor senses the light ray reflected from the low prism or sensor target when the liquid is below the low prism or sensor target. The photosensor also senses the light ray from the high prism or sensor target when the liquid level is below the high prism or sensor target. More particularly, the sensor uses the absence of the light ray to detect when the fluid level rises above the high incident surface of the high prism or sensor target.

However, due to space constraints in such an architecture, the optical prisms or sensor targets are generally arranged adjacent to one another. As fluid drains from the cartridge, the fluid tends to collect in the corners between the prisms or sensor targets, coating the reflecting surfaces of the prisms or sensor targets. Fluid on these surfaces refracts light, instead of reflecting it, and causes the cartridge to appear falsely full to the photosensor.

Thus, an improved method of sensing fluid quantity is desirable to determine when a fluid refill operation is appropriate.

This invention provides devices and methods for optically sensing reflected light to determine a fluid level.

This invention separably provides devices and methods for wicking fluid from the reflecting and refracting surfaces of optical level sensing prisms or sensor targets.

This invention separately provides devices and methods for wicking fluid away from the interface between optical level sensing prisms or sensor targets.

In various exemplary embodiments, an optical level sensing system is provided having a wicking means extending along a surface of an optical prism or sensor target. In various exemplary embodiments, an optical level sensing system is provided having a rib or channel extending along a surface of at least one optical prism or sensor target.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the devices, systems and methods of this invention will be described in detail with reference to the following figures, wherein.

DETAILED DESCRIPTION OF PREFERRED EMBODIMENTS

The following detailed description of various exemplary embodiments of the refillable fluid containers usable with fluid ejection systems or other technologies that store and consume fluids, according to this invention may refer to one specific type of fluid ejection system, e.g., an ink jet printer that uses the refillable fluid containers according to this invention, for sake of clarity and familiarity. However, it should be appreciated that the principles of this invention, as outlined and/or discussed below, can be equally applied to any known or later-developed fluid ejection systems, beyond the ink jet printer specifically discussed herein.

Any optical level sensing system can be used to sense the presence of fluid at the level of the prism or sensor target in a refillable fluid container or reservoir can be modified according to this invention. In particular, the optical level sensing system described in U.S. patent application Ser. No. 10/455,357, filed Jun. 6, 2003, which is incorporated by reference herein in its entirety, is suitable for modification according to this invention.

Figure 1:
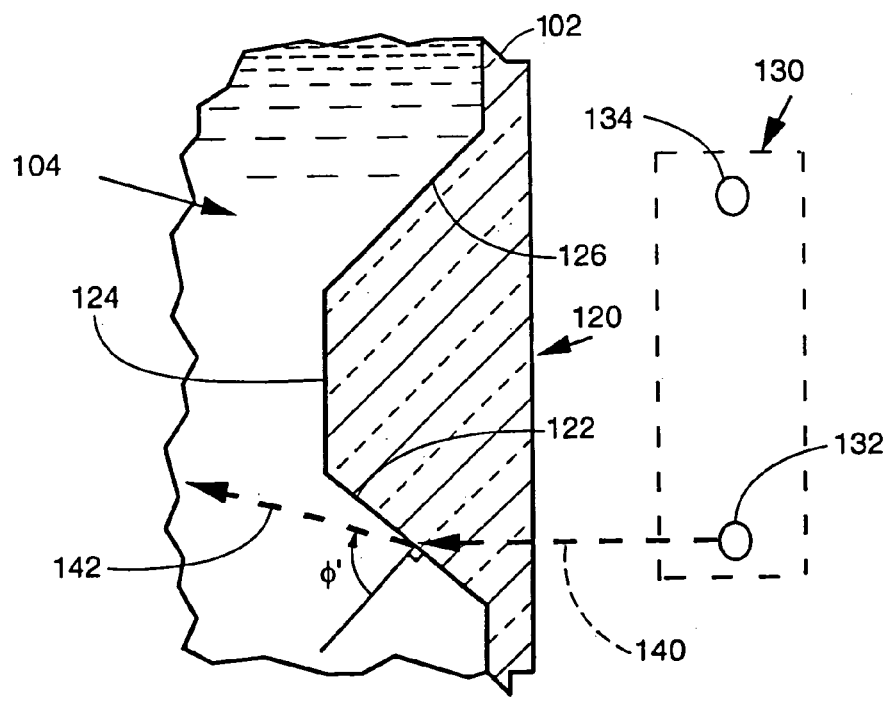
FIG. 1 shows an optical prism or sensor target in a fluid reservoir filled with fluid in a conventional arrangement.
Figure 2:
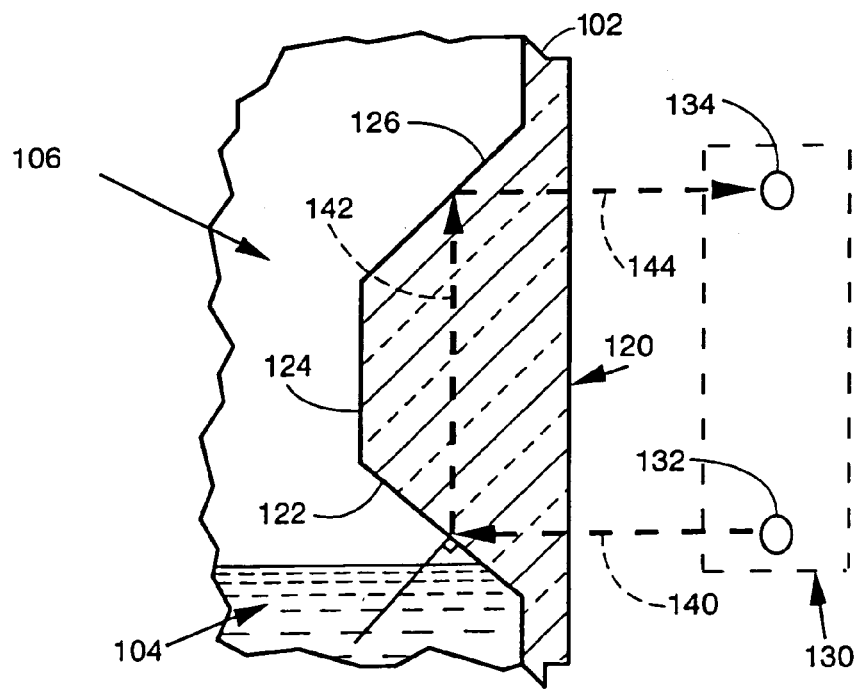
FIG. 2 shows an optical prism or sensor target in the fluid reservoir arrangement of FIG. 1 with the fluid substantially consumed.

FIG. 1 shows an elevation view of a section along one wall 102 of a refillable fluid container or reservoir 100 usable to contain a fluid 104. FIG. 2 shows air 106 that replaces the fluid 104 as it is consumed. As shown in FIGS. 1 and 2, an optical sensor detects the fluid 104 in the reservoir 100 and includes an optical prism 120 and an optical detector 130. The optical prism 120 is molded into the wall 102, and both are formed of a transparent material.

The optical prism 120 includes a number of facets 122, 124 and 126. The facets 122 and 126 are slanted 45° away from the wall 102 towards each other. The facet 124 is parallel to the wall 102 and joins the facets 122 and 126 at 45° angles.

The optical detector includes a light emitter 132 and a photosensor 134 facing the optical prism 120 and placed outside of the interior of the reservoir 100. The light emitter 132 projects an incident light ray 140 to the facet 122. If the level of the fluid 104 is higher than the facets 122, 124 and 126, as shown in FIG. 1, the light ray 140 is substantially refracted into the fluid 104 as a refracted ray 142. If the fluid 104 is depleted so that the level of the fluid 104 is below the projection of the light emitter 132, the light ray 140 is perpendicularly reflected as a reflected ray 144 from the facet 122 to the facet 126, and perpendicularly reflected further as a reflected ray 146 from the facet 126 to the photosensor 134.

When the light ray 140 strikes a surface plane, such as the facet 122 at an incident angle $\phi$ (relative to normal incidence, i.e., perpendicular to the plane), the angle of refraction depends on the ratio of refractive indices. Snell's law requires that the product of a first refractive index n and the sine of the first incident angle $\phi$ be equal to the product of a second refractive index n' and the sine of a second incident angle $\phi'$. This can be expressed as $n \sin \phi = n' \sin \phi'$. See Francis A. Jenkins et al., Fundamentals of Optics 24–28 (Robert A. Fry et al. eds., McGraw-Hill, Inc. 1976).

The light ray 140 approaches the plane on the facet 122 at an incident angle $\phi$ of 45°. As the incident angle $\phi$ approaches 90°, the refracted ray 142 approaches a critical angle $\phi_c$ from which no light ray can be refracted, but instead is either absorbed or reflected. The critical angle for the boundary separating two optical media is the smallest angle of incidence and can be expressed as $\phi_c = \sin^{-1}(n'/n)$. See Jenkins at 26.

For an interface between, for example, polystyrene and liquid ink, the critical angle $\phi_c$ is 56.8°, which is greater than the incident angle of 45°. Hence, when the fluid 104 is liquid ink, the light ray 140 will be transmitted into the fluid 104 as the refracted ray 142. By contrast; for an interface between the polystyrene and the air, the critical angle $\phi_c$ is only 39.0°, which is less than the incident angle of 45°. Hence, the air 106 opposite the facets 122 and 126 causes the light ray 140 to be reflected as the reflected rays 142 and 144.

In general, as long as the fluid 104 has an index of refraction of at least $n_p \sin \phi_c$ the light will not be reflected from the facet 122 towards the facet 126, where $n_p$ is the index of refraction of the material used to form the facet 122. For polypropylene at an incident angle of 45°, the minimum allowable index of refraction for the fluid 104 is approximately $n_f$ of 1.12. Of course, different minimum values of the index of refraction of the fluid will occur as the angle of the facets 122 and 126 to the light rays 140, 144 and 146 changes and/or as the index of refraction $n_p$ of the material used to form the facets 122 and 126 changes.

Consequently, the light ray 140 at an incident angle of 45° to the interface plane for the facet 122 will be either transmitted into the liquid ink or any fluid 104 having an index of refraction of at least 1.124, or else reflected from the air 106 interface. The photosensor 134 can detect the reflected ray 144, but not the refracted ray 142. Thus, the optical prism 120 placed at a particular level in the fluid reservoir 100 can detect whether the liquid ink 104 is present at that level.

It should be appreciated that the optical prism 120 can be composed of any of several materials transparent in the wavelength of light being transmitted to the fluid. Such materials include commonly available polymers, including, for example, polystyrene, which has a refractive index of 1.589, polypropylene (atactic), which has a refractive index of 1.474; polymethyl methacrylate, which has a refractive index of 1.489; polyethylene, which has a refractive index of 1.510; and polycarbonate which has a refractive index of 1.586.

It should also be appreciated that, in various exemplary embodiments, the optical prism 120 can be used across a wide spectrum of electromagnetic radiation wavelengths. Such wavelengths include long infrared (8–14 μm) wavelengths, mid infrared (3–6 μm) wavelengths, near infrared (0.75–2 μm) wavelengths, visible light (0.38–0.75 μm) wavelengths and near ultraviolet (0.2–0.38 μm) wavelengths.

In general, while the term "light" is used herein, it should be understood that this term is not limited to visible light wavelengths, or even to wavelengths indicated above. Rather, "light" is intended to encompass electromagnetic radiation of any appropriate wavelength, so long as the material is at least partially transmissive at that wavelength and Snell's law holds.

Examples of the optical prism are disclosed in U.S. Pat. No. 5,616,929 to Hara et al. and in U.S. Pat. No. 5,997,121 to Altfather et al., each of which is incorporated herein by reference in its entirety. The 929 patent discloses a total reflection prism and a Porro prism for visual observation. The 121 patent discloses the Porro prism with double reflections enabling a light source and a photosensor to be mounted adjacently mounted.

Figure 3:
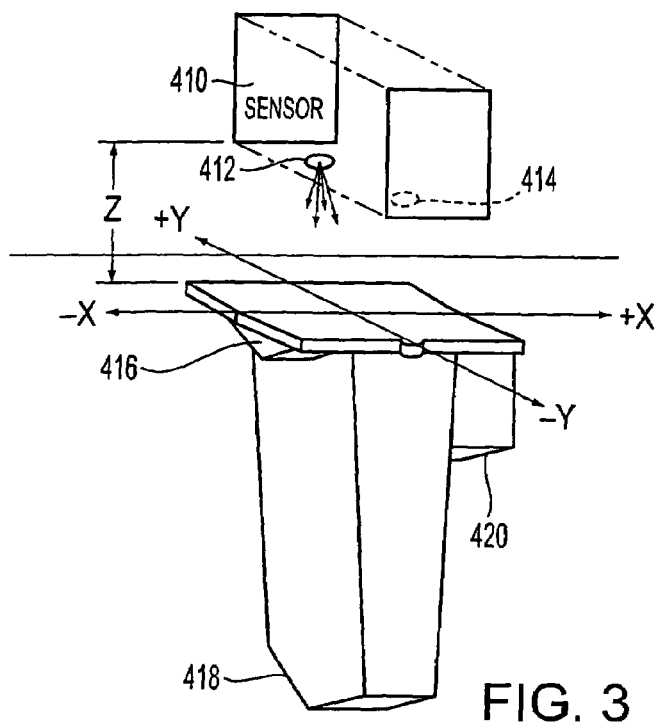
FIG. 3 is a schematic view of an optical level sensing system having a conventional arrangement.

FIG. 3 shows a schematic view of an optical level sensing system having a conventional arrangement. A sensor 410 including an emitter 412 and a photosensor 414 is positioned above an arrangement of optical prisms or sensor targets in a liquid reservoir. The arrangement of optical prisms or sensor targets includes a first prism or sensor target 418, a second prism or sensor target 420 and an optional third calibration prism or sensor target 416.

The first prism or sensor target 418 and the second prism or sensor target 420 are mounted on the top wall of the fluid sensor. The prisms or sensor targets are oriented downward into the fluid reservoir. The first prism or sensor target 418 includes a low first reflective surface, a low second reflective surface and a planar surface. The second prism or sensor target 420 includes a high first reflective surface and a high second reflective surface. The optional third calibration prism or sensor target 416 includes a first reflective surface, a second reflective surface and a planar surface. The first reflective surfaces are joined to the second respective reflector surfaces such that the first and second reflective surfaces are perpendicular to each other. The reflective surfaces form incident angles of 45° to their respective planar surfaces.

The sensor is generally positioned above the refillable fluid reservoir and aligned with the downward oriented prisms or sensor targets that are mounted on the top wall. The sensor includes an emitter and a photosensor. The sensor may be stationary, while the container travels. In this situation, each prism or sensor target passes by the sensor separately. Further, the sensor can be used to monitor the fluid level from a plurality of fluid reservoirs arranged to pass by the sensor in series.

As the first prism or sensor target 418 passes under the sensor, the emitter shines a light ray to strike the first low reflective surface. For a fluid level below the low reflective surfaces, the light ray will be reflected back to, and detected by, the photosensor. The photosensor receiving light thus indicates that the fluid reservoir is effectively empty.

As the second prism or sensor target 420 passes under the sensor, the emitter shines a light to strike the first high reflective surface. For a fluid level above the high reflective surfaces, the light ray will be refracted into the fluid and will not be detected by the photosensor, indicating that the fluid reservoir is full. The light ray reflected by the high reflective surfaces while not by the low reflective surfaces indicates that the fluid reservoir contains an intermediate level of fluid between full and empty.

As the optional third prism or sensor target 416 passes under the sensor, the light will normally be reflected back to the photosensor, as the reflective surfaces of the optional third prism or sensor target 416 normally remain above the fluid level. In various exemplary embodiments, an optional third prism or sensor target 416 is included and positioned adjacent to or joining with the wall and is used as a calibration prism. In such embodiments, the third prism or sensor target 416 is normally kept dry.

It should be appreciated that, in various exemplary embodiments, as the high reflector surfaces are progressively uncovered during fluid consumption, or covered during a filling operation, the amount of light will change accordingly. Thus, when the high reflector surfaces are mostly covered, only a little light will be reflected from the high reflector surfaces to the photosensor. As a result, the photosensor will output a low amplitude (or low current) signal. In contrast, when the high reflector surfaces are mostly uncovered, more, but less than a full amount of, light will be reflected from the high reflector surfaces to the photosensor. As a result, the photosensor will output a higher amplitude (or a higher current) signal.

When the output from the sensor indicates that the fluid reservoir is effectively empty, the fluid reservoir can be parked for refilling. During the refill operation, the sensor can be positioned adjacent to the second prism or sensor target and the resulting signal from the sensor monitored until a reflected light ray is no longer detected. This condition indicates that the fluid reservoir is full, upon which the refill operation ceases.

Figure 8:
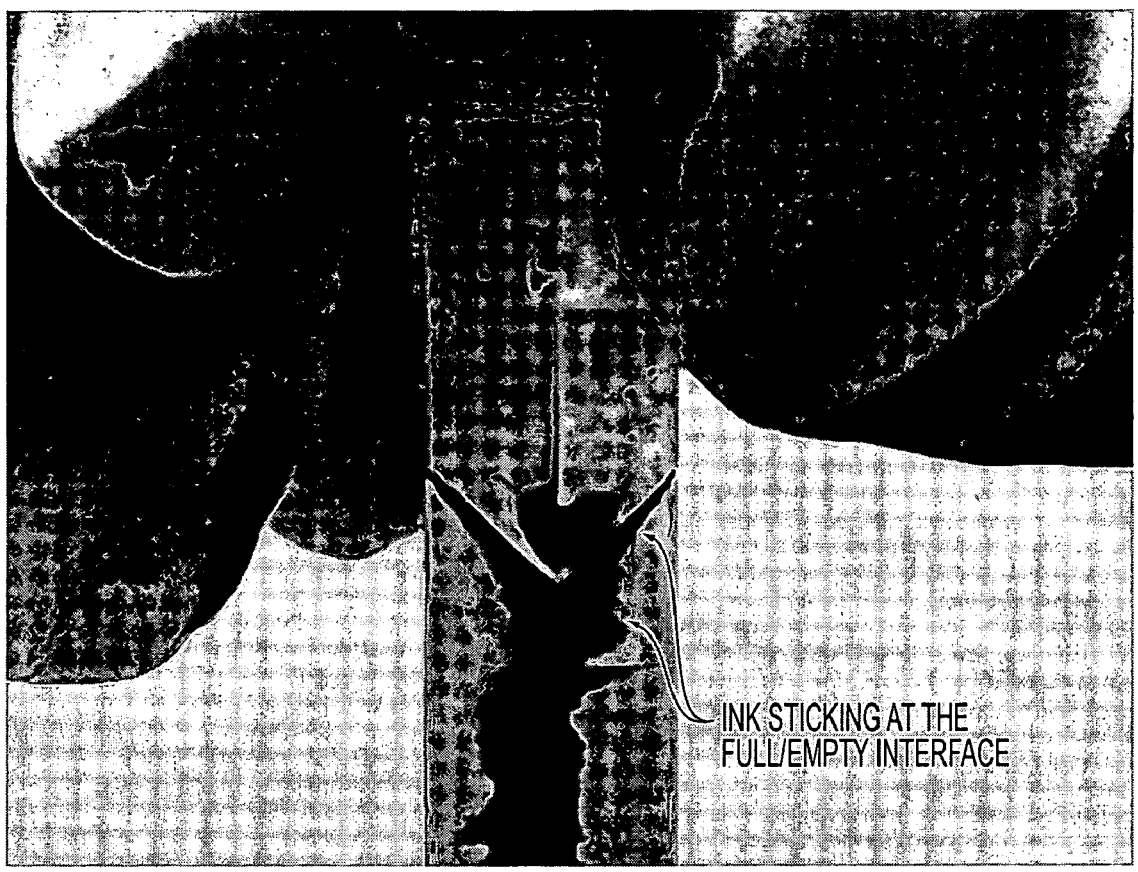
FIG. 8 is a photograph showing a fluid collecting at the interface of the optical prisms or sensor targets.

However, there are problems with this type of optical level sensing system. Due to space constraints in many architectures, the various prism or sensor target elements are stacked together in an abutting manner. Because of this, as fluid is drained from the fluid reservoir, it tends to become stuck in corners, or junctures, between the prisms or sensor targets, which at least partially coats the critical reflective surfaces of the prisms or sensor targets. As a result, rays of light passing through the optical prism or sensor target tend to be refracted in these coated areas rather than reflected. This may result in false sensor readings. For example, the sensor may sense a full reservoir condition when in fact the reservoir is empty. See FIG. 8.

To overcome such problems, various embodiments of the invention provide devices, structures and methods to wick fluid from critical optical surfaces of the prism or sensor target elements.

Figure 4:
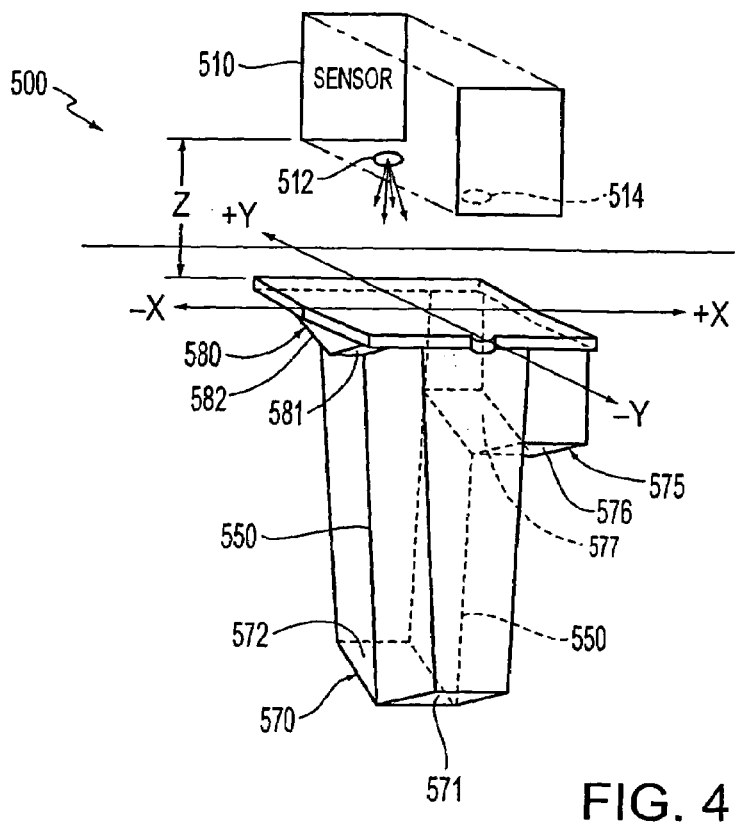
FIGS. 4 and 5 are schematic views of exemplary embodiments of an optical level sensing system having a wicking element in accordance with aspects of this invention.
Figure 5:
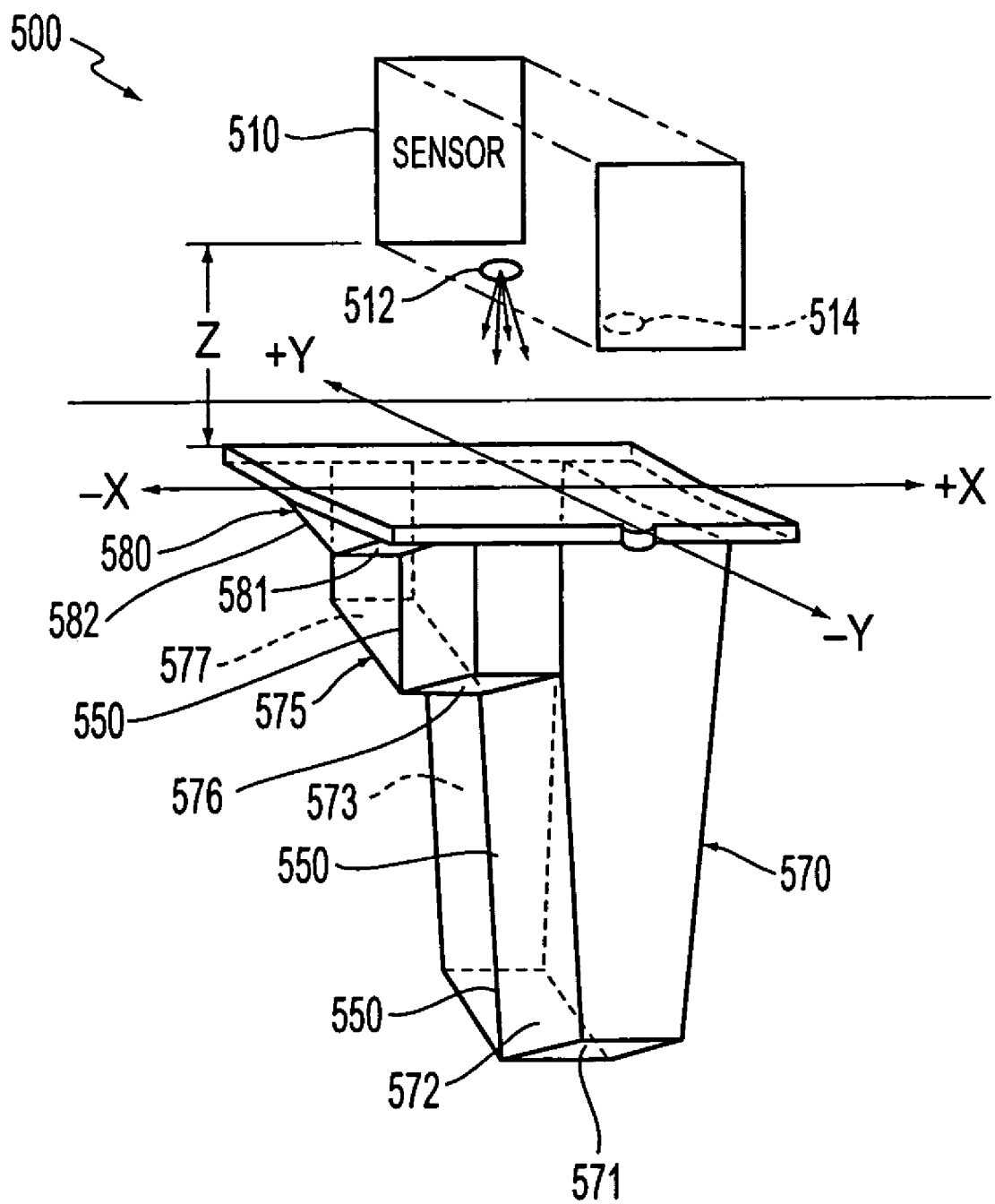
Figure 6A:
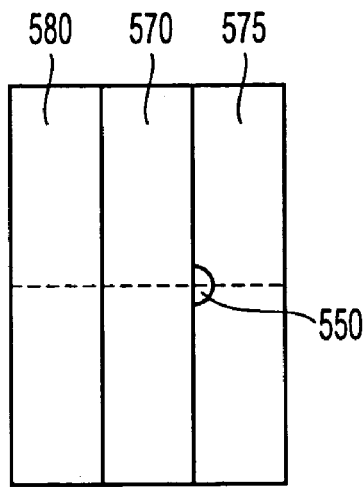
FIG. 6 is a series of x-y cross-sectional schematic views of exemplary embodiments of an optical level sensing system having a wicking element in accordance with aspects of this invention.
Figure 6B:
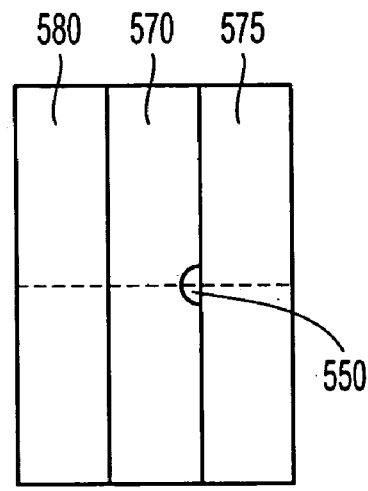
Figure 6C:
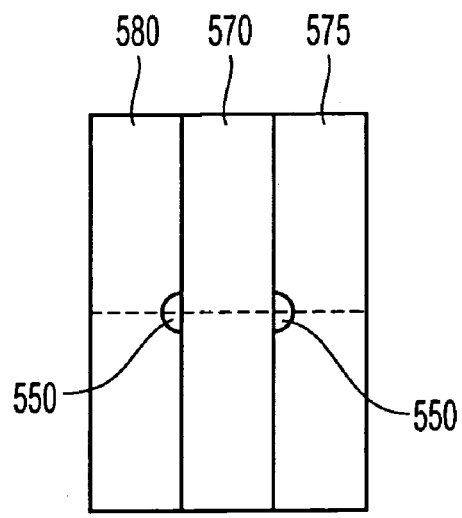
Figure 6D:
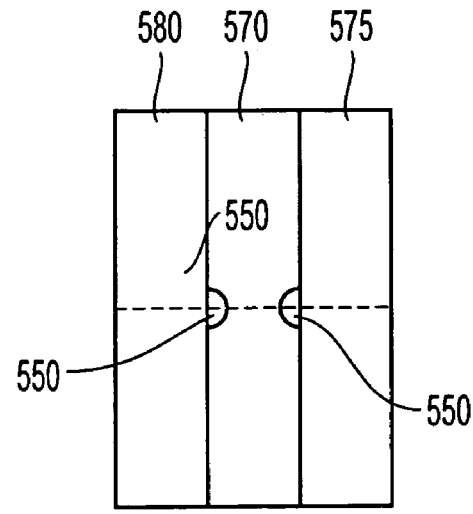
Figure 6E:
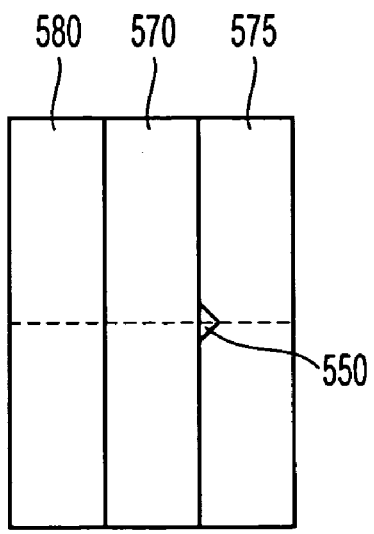
Figure 6F:
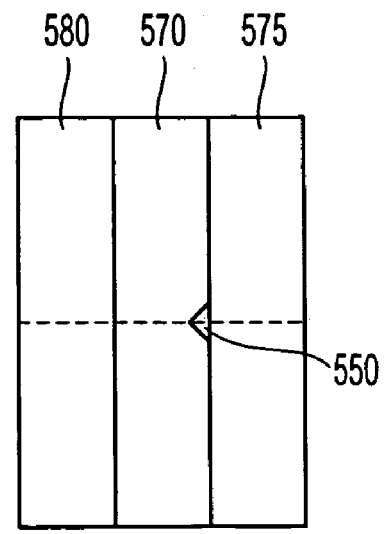
Figure 6G:
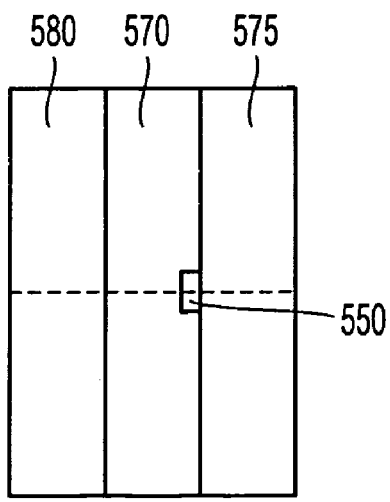
Figure 6H:
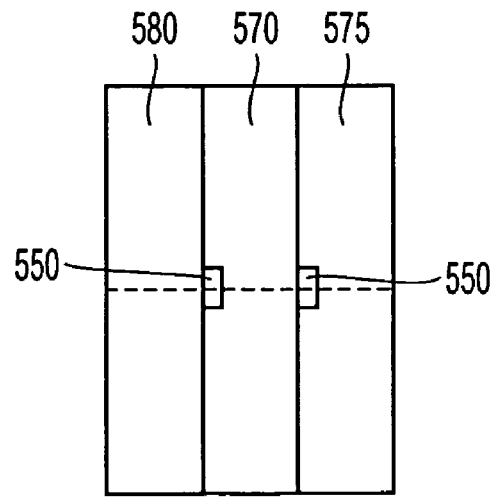

FIGS. 4 and 5 show schematic views of exemplary embodiments of an optical level sensing system arranged according to this invention. The sensor system 500 includes an arrangement of optical prisms or sensor targets, including a first prism or sensor target 570, a second prism or sensor target 575, an optional third prism or sensor target 580, and a sensor 510 including an emitter 512 and a photosensor 514 is positioned above the arrangement of optical prisms or sensor targets in a liquid reservoir (not shown). The arrangement of optical prisms or sensor targets includes a first prism or sensor target 570, a second prism or sensor target 575 and an optional third prism or sensor target 580. The refillable fluid reservoir includes a bottom wall, a top wall, a front wall, a rear wall, a left wall and a right wall. The refillable fluid reservoir, which in these exemplary embodiments are associated with a moving fluid ejection head, travels along a medium onto which the fluid is to be ejected. A wicking element 550 extends along at least one non-reflective, non-critical surface of at least one of the second prism or sensor target 575 and the first prism or sensor target 570.

In various exemplary embodiments, the first prism or sensor target 570, the second prism or sensor target 575 and the optional third calibration prism or sensor target 580 are mounted on the top wall of the refillable fluid reservoir. The prisms or sensor targets 570, 575 and 580 are oriented downward into the fluid reservoir. Alternatively, the prisms or sensor targets 570, 575 and 580 can be mounted on the bottom wall and oriented upward into the refillable fluid reservoir. The first prism or sensor target 570 includes a low first reflective surface 571, a low second reflective surface 572, at least one non-reflecting, non-critical surface 573 and a planar surface 574 separably adjacent to or joining with the top wall. The medium prism or sensor target 575 includes a low first reflective surface 576, a low second reflective surface 577, at least one non-reflecting, non-critical surface 578 and a low planar surface 579 separably adjacent to or joining with the top wall. The optional third prism or sensor target 580 includes a first reflective surface 581, a second reflective surface 582, at least one non-reflecting, non-critical surface 583 and a planar surface 584 separably adjacent to or joining with the top wall. The first reflective surfaces 571, 576 and 581 are joined to the second respective reflector surfaces 572, 577 and 582 such that the reflective surfaces 571 and 572, 576 and 577, and 581 and 582 are perpendicular to each other, respectively, and form incident angles of 45° to their respective planar surfaces 574, 579 and 584.

The optical prisms or sensor targets may be arranged in any suitable manner. In various exemplary embodiment, the optical prisms or sensor targets are arranged adjacent to one another, such that the prisms or sensor targets are disposed in a linear fashion.

The sensor 510 is positioned above the refillable fluid reservoir and aligned with the downward oriented prisms or sensor targets 570, 575 and 580 that are mounted on the top wall. In various exemplary embodiments, the sensor 510 can be positioned below the fluid reservoir when upward oriented prisms or sensor targets 570, 575 and 580 extend upward from the bottom wall. In various exemplary embodiments, the sensor 510 is stationary, while the container travels. In this situation, each prism or sensor target 570, 575 and 580 passes by the detector 514 separately. Further, the sensor 510 can be used to monitor the fluid level from a plurality of fluid reservoirs arranged to pass by the sensor 510 in series.

As the first prism or sensor target 570 passes under the sensor 510, the emitter 512 shines a light ray to strike the first low reflective surface 571. For a fluid level below the low reflective surfaces 571 and 572, the light ray will be reflected back to, and detected by, the photosensor 514. The photosensor 514 receiving light thus indicates that the fluid reservoir is effectively empty.

As the second prism or sensor target 575 passes under the sensor 510, the emitter 512 shines a light ray to strike the first high reflective surface 576. For a fluid level above the high reflective surfaces 576 and 577, the light ray will be refracted into the fluid and will not be detected by the photosensor 514, indicating that the fluid reservoir is full. The light ray reflected by the high reflective surfaces 576 and 577 while not by the low reflective surfaces 576 and 577 indicates that the fluid reservoir contains an intermediate level of fluid between full and empty.

It should be appreciated that, in various exemplary embodiments, as the high second reflector surface 577 is progressively uncovered during fluid consumption, or covered during a filling operation, the amount of light will change accordingly. Thus, when the high second reflector surface 577 is mostly covered, only a little light will be reflected from the high second reflector surface 577 to the photosensor 514. As a result, the photosensor 514 will output a low amplitude (or low current) signal. In contrast, when the high second reflector surface 577 is mostly uncovered, more, but less than a full amount of, light will be reflected from the high second reflector surface 577 to the photosensor 514. As a result, the photosensor 514 will output a higher amplitude (or a higher current) signal.

When the output from the sensor 510 indicates that the fluid reservoir is effectively empty, the fluid reservoir can be parked for refilling. During the refill operation, the sensor 510 can be positioned adjacent to the second prism or sensor target 575 and the resulting signal from the sensor 510 monitored until a reflected light ray is no longer detected. This condition indicates that the fluid reservoir is full, upon which the refill operation ceases.

As the amount of fluid in the fluid reservoir decrease, the fluid level becomes lower. However, fluid may collect on the optical prisms or sensor targets and at the junctures between the optical prisms or sensor targets due to surface tension.

In various exemplary embodiments, at least one wicking element 550 is oriented along at least one non-critical surface 573 of the first prism or sensor target 570, and extends from the apex of the first prism or sensor target 570 to the apex of second prism or sensor target 575. In various exemplary embodiments, at least one wicking element 550 is oriented along at least one non-critical surface 573 of the first prism or sensor target 570, and extends from the apex of the first prism or sensor target 570 to the apex of third prism or sensor target 580. In various exemplary embodiments, at least one wicking element 550 is oriented along at least one non-critical surface 578 of the second prism or sensor target 575, and extends from the apex of the second prism or sensor target 575 to the apex of third prism or sensor target 580. The at least one wicking element 550 provides a means for fluid to drain into the fluid reservoir for by providing a lower energy alternative to collecting on the prisms or sensor targets or between the prisms or sensor targets. In various exemplary embodiments, at least one wicking element 550 is oriented along at least one non-reflective, non-critical surface 573 of the first prism or sensor target 570, and extends from the apex of the first prism or sensor target 570 to the apex of second prism or sensor target 575 and at least one wicking element 550 is oriented along at least one non-reflective, non-critical surface 573 of the first prism or sensor target 570, and extends from the apex of the first prism or sensor target 570 to the apex of third prism or sensor target 580. In various exemplary embodiments, at least one wicking element oriented along at least one non-reflective, non-critical surface 573 of the first prism or sensor target 570, and extends from the apex of the first prism or sensor target 570 to the apex of second prism or sensor target 575 and at least one wicking element 550 is oriented along at least one non-reflective, non-critical surface 578 of the second prism or sensor target 575, and extends from the apex of the second prism or sensor target 575 to the apex of third prism or sensor target 580.

In various exemplary embodiments, the optical level sensing system is arranged such that the first prism or sensor target 570 is situated between the second prism or sensor target 575 and the third prism or sensor target 580, and the at least one non-critical surface of the prisms or sensor targets are adjacent to or joined with each other, as illustrated in FIG. 4. In various exemplary embodiments, the optical level sensing system is arranged such that the second prism or sensor target 575 is situated between the first prism or sensor target 570 and the third prism or sensor target 580, and the at least one non-reflective surface of the prisms or sensor targets are adjacent to or joined with each other, as illustrated in FIG. 5. FIGS. 4 and 5 illustrate two possible exemplary and non-limiting arrangements of the prisms or sensor targets. In various exemplary embodiments, the optical level sensing system is arranged such that the third prism or sensor target 580 is situated between the first prism or sensor target 570 and the second prism or sensor target 575, and the at least one non-reflective surface of the prisms or sensor targets are adjacent to or joined with each other.

It should be understood that the invention is not limited to any particular geometry or arrangement of optical level sensing systems, optical prisms or sensor targets, or wicking means. The invention contemplates any and all variations in geometry and arrangement of the individual elements and the optical level sensing system as a whole.

The wicking element 550 may be formed as an integral part of the optical level sensing system or the optical level sensing system and wicking element may be assembled from individually manufactured elements. The wicking element 550 may be fixed to the optical level sensing system, mated to the optical level sensing system or separately provided adjacent the optical level sensing system. The wicking element 550 may be made from any suitable material capable of wicking fluid by capillary or other action. Non-limiting examples include glass, plastic, metal, foam, natural fibers and the like. In addition, the wicking element 550 may be formed as a rib or channel on the prism or sensor target surface.

FIG. 6 shows a series of schematic top views of exemplary embodiments of an optical level sensing system having a wicking element 550 in accordance with this invention. As discussed above, the geometry of the wicking element 550 is not particularly limited. The wicking element 550 may have any suitable shape for wicking fluid from the junction between prisms or sensor targets, including that of a channel or a rib. The path geometry of the wicking element 550 along at least one non-reflective, non critical surface of the prisms or sensor targets is not particularly limited, and may include interruptions in the path so long as the wicking element is suitable for wicking fluid from the junction between prisms or sensor targets. The wicking element 550 of some exemplary embodiments extends from the lowermost tip of a lower prism or sensor target to the lowermost tip of an adjacent abutting higher prism or sensor target, such that the fluid is wicked completely from the reflective surfaces to the bottom of the reservoir.

Figure 7:
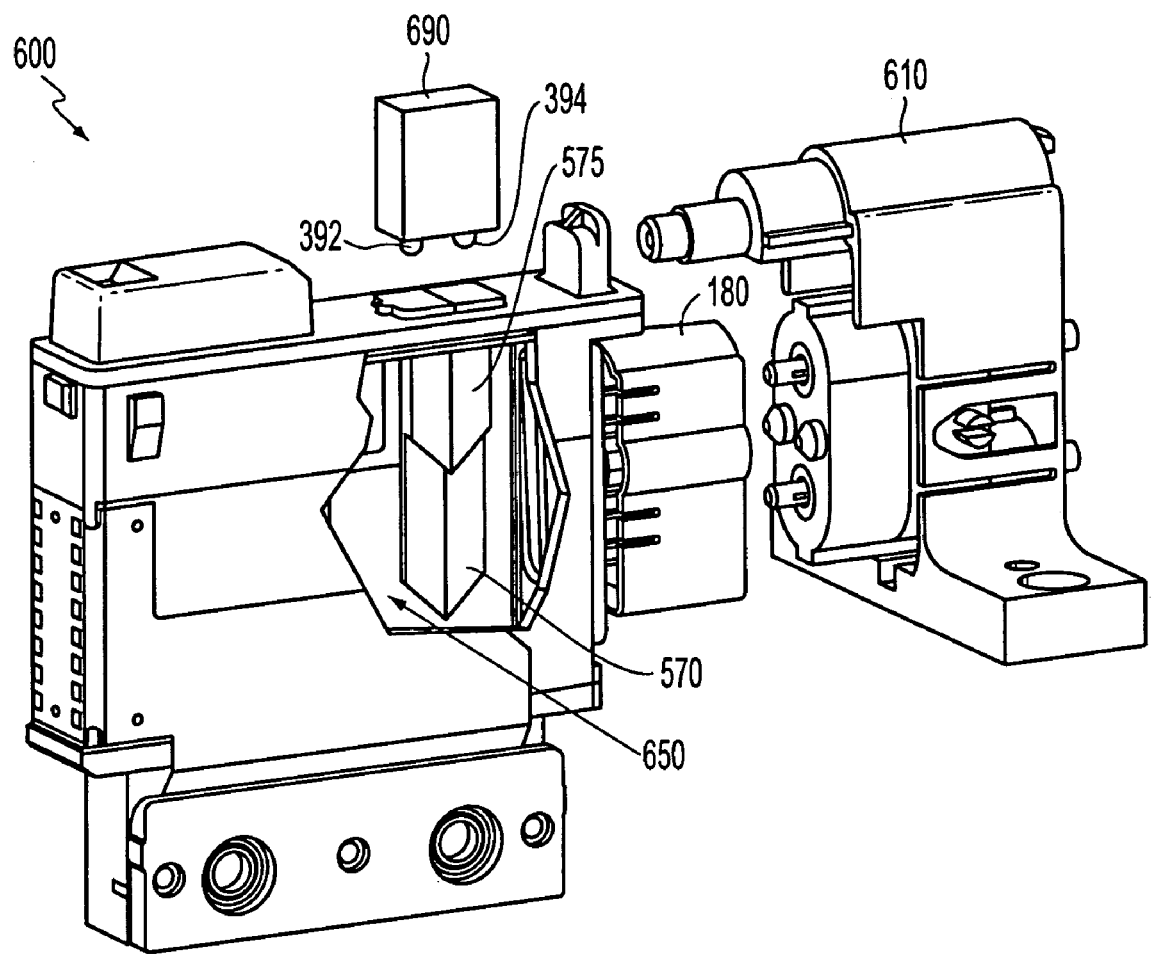
FIG. 7 is a schematic view of an exemplary embodiment of a fluid refill system usable with the fluid level sensors shown in FIGS. 4–6.

FIG. 7 shows a fluid refill system usable with a fluid ejection head 600. The fluid ejection head 600 includes the refillable fluid container or reservoir 650 with the sensor systems 570 and 575 as described. Any of the optical fluid level sensing systems described herein and/or shown in any of FIGS. 4 and/or 5, or any suitable variation thereof can also be used in the fluid ejection head 600. The fluid reservoir 650 of the fluid ejection head 600 can be connected to a refill station 610 when the detector 690 detects that the fluid level in the fluid reservoir 350 has fallen below the first prism or sensor target 570. Subsequently, the fluid reservoir 650 of the fluid ejection head 600 can be disconnected from the refill station 610 when the detector 690 detects that the level in the fluid reservoir 650 has risen to the second prism or sensor target 575.

While this invention has been described in conjunction with the exemplary embodiments outlined above, various alternatives, modifications, variations, improvements, and/or substantial equivalents, whether known or that are, or may be, presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the systems, methods and devices according to this invention are intended to embrace all known or later-developed alternatives, modifications, variations, improvements, and/or substantial equivalents.

What is claimed is:

1. An optical fluid level sensing system usable to determine a level of a liquid in a fluid container, the optical fluid level sensing system comprising:
    a low sensor target extending in a fluid reservoir to a low position, the low sensor target having a low incident surface, a low reflecting surface and at least one non-critical surface and
    a high sensor target extending in the fluid reservoir to a high position, the high sensor target having a high incident surface, a high reflecting surface and at least one non-critical surface; and
    at least one wicking means,
    wherein the at least one wicking means is located on at least one of the at least one non-critical surface of the low sensor target or the at least one non-critical surface of the high sensor target, and the at least one wicking means extends from an apex of the low sensor target to an apex of the high sensor target; and
    wherein light is projected through at least one of the low sensor target to the low incident surface and the high sensor target to the high incident surface, and the light is reflected from at least one of the low sensor target and the high sensor target when the level of the fluid is below the at least one of the low sensor target and the high sensor target.

2. An optical fluid level sensing system according to claim 1, wherein the at least one wicking means is located on at least one of the at least one non-critical surface of the low sensor target.

3. An optical fluid level sensing system according to claim 2, wherein the at least one wicking means is a channel in the at least one of the at least one non-critical surface of the low sensor target.

4. An optical fluid level sensing system according to claim 2, wherein the at least one wicking means is a rib on the at least one of the at least one non-critical surface of the low sensor target.

5. An optical fluid level sensing system according to claim 2, wherein the at least one wicking means is an integral part of the at least one of the at least one non- critical surface of the low sensor target.

6. An optical fluid level sensing system according to claim 2, wherein the at least one wicking means is fixed to the at least one of the at least one non-critical surface of the low sensor target.

7. An optical fluid level sensing system according to claim 2, wherein the at least one wicking means is separable from the at least one of the at least one non- critical surface of the low sensor target.

8. An optical fluid level sensing system according to claim 1, wherein the at least one wicking means is located on at least one of the at least one non-critical surface of the high sensor target.

9. The optical fluid level sensing system according to claim 1, wherein the wicking means extends from a bottom of the high sensor target to the bottom of the low sensor target.

10. The optical fluid level sensing system according to claim 1, further comprising a calibration sensor, a further wicking means being located on at least one of the at least one non-critical surface of the low sensor target and/or the at least one of the at least one non-critical surface of the high sensor target.

11. A refillable fluid container having at least one optical fluid level sensing system usable to determine a level of a fluid in the fluid container, each at least an optical fluid level sensing system structure comprising:
    a low sensor target extending in the fluid reservoir to a low position, the low sensor target having a low incident surface, a low reflecting surface and at least one non-critical surface; and
    a high sensor target extending in the fluid reservoir to a high position, the high sensor target having a high incident surface, a high reflecting surface and at least one non-critical surface; and
    at least one wicking means,
    wherein the at least one wicking means is located on at least one of the at least one non-critical surface of the low sensor target or the at least one non-critical surface of the high sensor target, and the at least one wicking means extends from an apex of the low sensor target to an apex of the high sensor target; and wherein light is projected through at least one of the low sensor target to the low incident surface and the high sensor target to the high incident surface, and the light is reflected from at least one of the low sensor target and the high sensor target when the level of the fluid is below the at least one of the low sensor target and the high sensor target.

12. The refillable fluid container according to claim 11, wherein the wicking means extends from a bottom of the high sensor target to the bottom of the low sensor target.

13. The refillable fluid container according to claim 11, further comprising a calibration sensor, a further wicking means being located on at least one of the at least one non-critical surface of the low sensor target and/or the at least one of the at least one non-critical surface of the high sensor target.

14. A sensor usable to determine a level of a fluid in a fluid reservoir, the sensor comprising:
an emitter that projects light;
a photosensor;
a low sensor target extending in the fluid reservoir to a low position, the low sensor target having a low incident surface, a low reflecting surface and at least one non-critical surface; and
a high sensor target extending in the fluid reservoir to a high position, the high sensor target having a high incident surface, a high reflecting surface and at least one non-critical surface; and
at least one wicking means,
wherein the at least one wicking means is located on at least one of the at least one non-critical surface of the low sensor target or the at least one non-critical surface of the high sensor target, and the at least one wicking means extends from an apex of the low sensor target to an apex of the high sensor target; and
wherein light is projected through at least one of the low sensor target to the low incident surface and the high sensor target to the high incident surface, and the light is reflected from at least one of the low sensor target and the high sensor target when the level of the fluid is below the at least one of the low sensor target and the high sensor target;
the emitter projects light through at least one of the low sensor target to the low incident surface and the high sensor target to the high incident surface, and
the photosensor senses light reflected from the low sensor target when the level of the fluid is below the low sensor target.

15. The sensor according to claim 14, wherein the wicking means extends from a bottom of the high sensor target to the bottom of the low sensor target.

16. The sensor according to claim 14, further comprising a calibration sensor, a further wicking means being located on at least one of the at least one non-critical surface of the low sensor target and/or the at least one of the at least one non-critical surface of the high sensor target.

17. A fluid ejection head having a fluid reservoir, the fluid reservoir having at least one optical fluid level sensing system usable to determine a level of a fluid in the fluid reservoir, each at least one optical fluid level sensing system comprising:
an emitter that projects light;
a photosensor;
a low sensor target extending in the fluid reservoir to a low position, the low sensor target having a low incident surface, a low reflecting surface and at least one non-critical surface; and
a high sensor target extending in the fluid reservoir to a high position, the high sensor target having a high incident surface, a high reflecting surface and at least one non-critical surface; and
at least one wicking means,
wherein the at least one wicking means is located on at least one of the at least one non-critical surface of the low sensor target or the at least one non-critical surface of the high sensor target, and the at least one wicking means extends from an apex of the low sensor target to an apex of the high sensor target; and
wherein light is projected through at least one of the low sensor target to the low incident surface and the high sensor target to the high incident surface, and the light is reflected from at least one of the low sensor target and the high sensor target when the level of the fluid is below the at least one of the low sensor target and the high sensor target, and
wherein the emitter projects light through at least one of the low sensor target to the low incident surface and the high sensor target to the high incident surface, and the photo sensor senses light reflected from the low sensor target when the level of the fluid is below the low sensor target.

18. The fluid ejection head according to claim 17, wherein the wicking means extends from a bottom of the high sensor target to the bottom of the low sensor target.

19. The fluid ejection head according to claim 17, further comprising a calibration sensor, a further wicking means being located on at least one of the at least one non-critical surface of the low sensor target and/or the at least one of the at least one non-critical surface of the high sensor target.

* * * * *